March 9, 1926.  
R. C. BROWNE  
1,576,032  
AUTO LUNCHEON KIT  
Filed April 29, 1925  
2 Sheets-Sheet 1
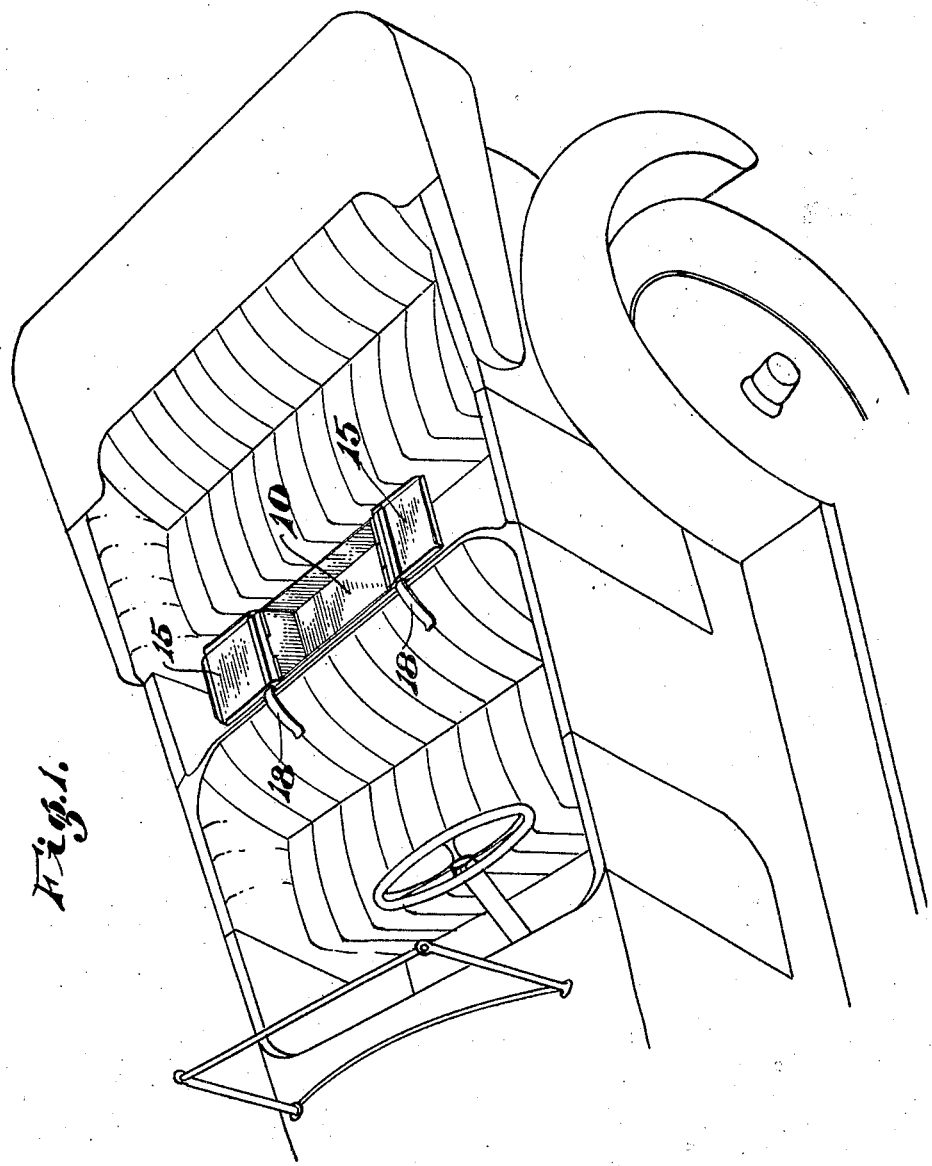
INVENTOR  
ROBERT C. BROWNE  
BY Dewey, Strong, Townsend & Loftus  
ATTYS.

March 9, 1926.
R. C. BROWNE
1,576,032
AUTO LUNCHEON KIT
Filed April 29, 1925
2 Sheets-Sheet 2
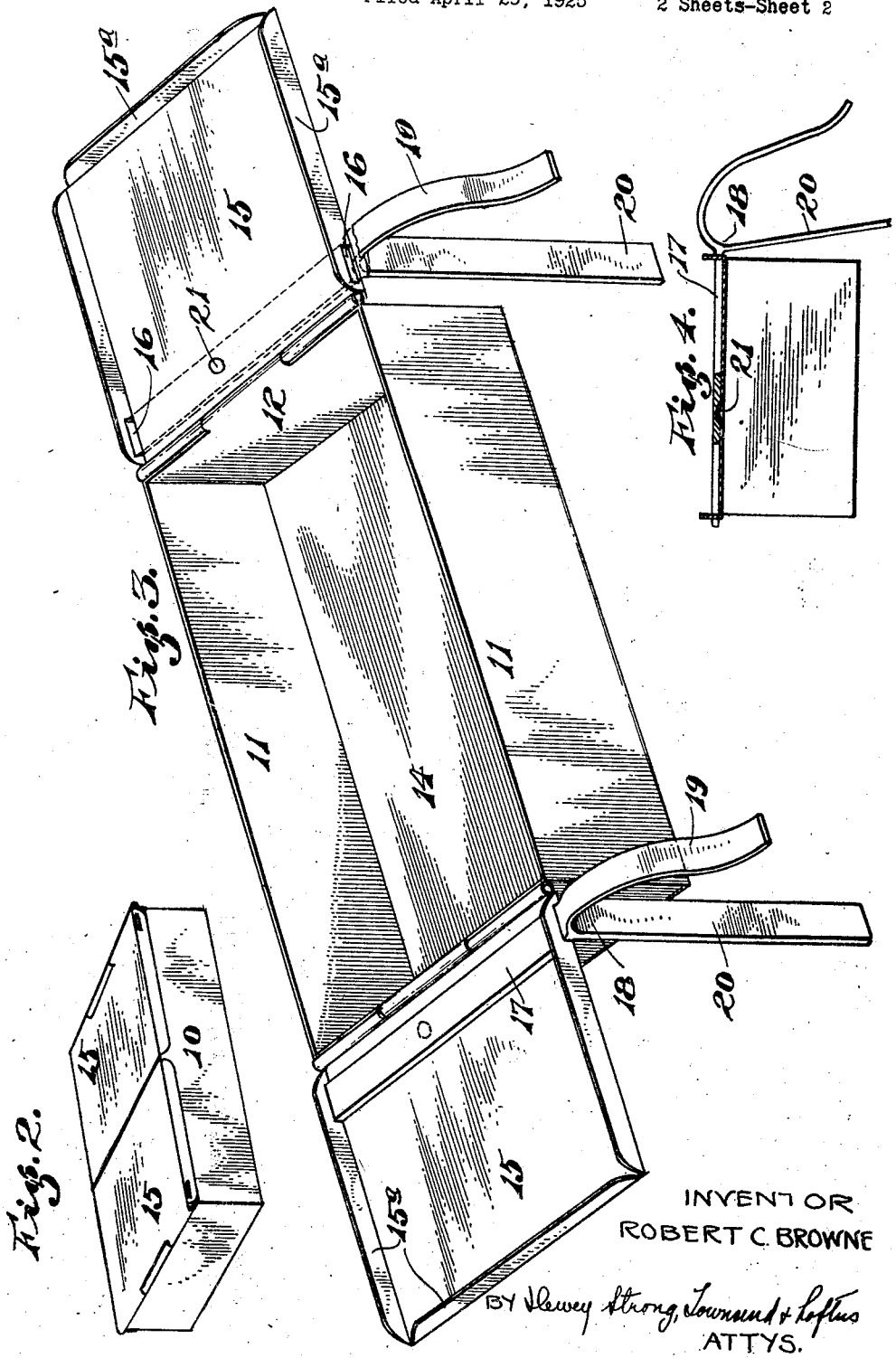
INVENTOR
ROBERT C. BROWNE
BY Dewey Strong, Townsend & Loftus
ATTYS.

Patented Mar. 9, 1926.

1,576,032

UNITED STATES PATENT OFFICE.

ROBERT C. BROWNE, OF ALAMEDA, CALIFORNIA.

AUTO LUNCHEON KIT.

Application filed April 29, 1925. Serial No. 26,660.

*To all whom it may concern:*

Be it known that I, ROBERT C. BROWNE, a citizen of the United States, residing at Alameda, county of Alameda, and State of California, have invented new and useful Improvements in Auto Luncheon Kits, of which the following is a specification.

This invention relates to a luncheon kit adapted for use by picnicking autoists.

It is the principal object of the present invention to provide an improved combined luncheon container and server which when used in the latter capacity, may be expeditiously connected with the front seat of the car and suspended within the tonneau at a point convenient to the occupants of the rear seat.

In carrying out this object, I provide a rectangular container which may be packed with various articles necessary to a lunch, and which is provided with hinged trays which serve as covers for the container when the latter is closed. I also provide brackets for removably engaging the rear of the front seat of the auto. These brackets may be connected with trays when the latter are extended, to firmly support the trays and container in a horizontal position so that it may be conveniently arranged as a server in the tonneau.

One form which the invention may assume is exemplified in the following description and illustrated by way of example in the accompanying drawings, in which:

Fig. 1 is a perspective view of an automobile disclosing my device arranged as a luncheon server and supported within the tonneau of the car.

Fig. 2 is a perspective view of the device showing it closed.

Fig. 3 is an enlarged perspective view of the luncheon kit arranged as a luncheon server and disclosing the supporting brackets connected therewith.

Fig. 4 is a section through one of the trays disclosing the connection between it and one of the brackets.

Referring more particularly to the accompanying drawings, 10 indicates a rectangular container preferably formed of sheet metal. This container comprises side sections 11, end sections 12, and a bottom 14.

At each end of the container is a tray 15 which is hinged at its inner end to the upper edge of the adjacent end section 12. The side and outer edges of the trays are formed with upturned flanges 15ª as illustrated.

It should be stated that the length of each tray is equivalent to one half the length of the container so that the trays may co-operate to form a closure for the top of the container as disclosed in Fig. 2.

The side flanges of the trays are formed with transversely aligned openings 16 which are located in close proximity to the hinging points of the trays. These openings in the trays are adapted to receive the horizontal arms 17 of supporting brackets 18. Each of these brackets is formed with a hooked portion 19 which cooperates with a vertical arm 20 in firmly embracing the edge of the back portion of the front seat of an automobile. The hook fits over the edge of the seat back and the arm 20 engages the rear surface of the seat back when the brackets are mounted in position. When so disposed the horizontal arms 17 of the brackets will extend horizontally and support the container, with the trays extended, at the rear of the front seat and within the tonneau.

To latch the arms 17 to the trays, the latter are formed with projections 21 which are adapted to engage recesses formed in the undersurface of the arms 17. Such engagement preventing accidental disengagement of the brackets and trays.

In use the device is constructed as described. The lunch and utensils may be packed in the container and the trays folded over the top of the container to form a complete closure. This forms a luncheon container which occupies but a minimum of space and which may be stored anywhere desired in the car during the trip.

When the luncheon is to be served, the trays are extended and the horizontal arms of the brackets 18 are fitted thereto as shown in Fig. 3. The brackets are then hooked on the back of the front seat of the car to suspend the kit within the tonneau at approximately the level of the back of the front seat. This height is convenient to the occupants of the rear seat.

When the kit is arranged as just described, it will be firmly held in position and the trays may be utilized to support food or utensils.

It is obvious that smaller devices of this character may be made to fit the sides or doors of the car.

The device here disclosed is simple in construction and very convenient for autoists wishing to lunch in the car.

While I have shown the preferred form of my invention, it is to be understood that various changes in its construction may be made without departing from the spirit of the invention as defined in the appended claims.

Having thus described my invention, what I claim and desire to secure by Letters Patent is:

1. A device of the character described comprising a container, trays hinged thereto and capable of forming a closure therefor or being extended horizontally to serve as trays, brackets adapted to removably engage said trays, said brackets being adapted to removably engage the back of the front seat of an automobile to rigidly support the container and trays in a horizontal position in the tonneau of the automobile.

2. A device of the character described comprising a rectangular container, trays hinged to the ends thereof and adapted to be folded over the container and unite to form a closure therefor, brackets each having a portion adapted to firmly embrace an upright portion of an automobile, said brackets each being adapted to removably engage said trays when extended to firmly support the trays and container in a horizontal position within the automobile.

3. A device of the character described comprising a rectangular container, trays hinged to the top edges of the ends of the container, said trays being adapted to be folded over the container to form a closure for the same, brackets having hooked portions adapted to embrace the upper edge of the back of the front seat of an automobile, said brackets having horizontal extensions adapted to removably engage said trays to firmly support said trays and container within the tonneau of the automobile.

ROBERT C. BROWNE.